(12) United States Patent
Nakayama (10) Patent No.: US 7,046,458 B2
(45) Date of Patent: May 16, 2006

(54) FISHEYE LENS AND IMAGING DEVICE USING IT

(75) Inventor: Toru Nakayama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/091,497

(22) Filed: Mar. 29, 2005

(65) Prior Publication Data

US 2005/0219714 A1    Oct. 6, 2005

(30) Foreign Application Priority Data

Mar. 31, 2004   (JP)   ............................. 2004-104244

(51) Int. Cl.
  *G02B 13/06*   (2006.01)
  *G02B 13/04*   (2006.01)
(52) U.S. Cl. ...................... 359/725; 359/749
(58) Field of Classification Search ................ 359/725, 359/749–753
  See application file for complete search history.

(56) References Cited

U.S. PATENT DOCUMENTS 5,477,389 A * 12/1995 Ito et al. ...................... 359/752

FOREIGN PATENT DOCUMENTS

| JP | 53-83623 | 7/1978 |
|---|---|---|
| JP | 3396839 | 2/2003 |

* cited by examiner

*Primary Examiner*—Hung Xuan Dang
*Assistant Examiner*—Jack Dinh
(74) *Attorney, Agent, or Firm*—Arnold International; Jon W. Henry; Bruce Y. Arnold (57) ABSTRACT

A fisheye lens with a field angle of at least one hundred sixty degrees is formed of two lens groups, arranged in order from the object side, as follows: a first lens group having negative refractive power and a second lens group having positive refractive power. The first lens group includes, arranged in order from the object side, two lens elements, each having negative refractive power and a meniscus shape with the convex surface on the object side, a lens element having negative refractive power with a concave surface on the image side, and two lens elements of opposite refractive powers. The second lens group includes, arranged in order from the object side, two lens elements of opposite refractive powers, a stop, and two lens elements of opposite refractive powers. The fisheye lens preferably satisfies specified conditions related to spacings of lens surfaces and to distortion characteristics of the fisheye lens.

20 Claims, 6 Drawing Sheets

FISHEYE LENS AND IMAGING DEVICE USING IT

FIELD OF THE INVENTION

The present invention relates to fisheye lenses with equidistant image projections and to imaging devices that use such fisheye lenses. The present invention particularly relates to fisheye lenses that are optimally used to form images in imaging devices, including imaging devices that record images and/or are used for surveillance.

BACKGROUND OF THE INVENTION

Fisheye lenses with a field angle, that is, an entire picture angle, of nearly one hundred eighty degrees are known. These fisheye lenses, which may be used in video imaging devices, form images on a single picture surface, which may be circular in shape, with high distortion aberration so that areas as well as the borders of the image are distorted, along with increasing the field of view and the need for image processing. Furthermore, using computer software, modern techniques for removing distortion aberration that appears in images encourages greater use of fisheye lenses.

On the other hand, the high resolution obtainable in newer imaging devices, accompanied by computers with faster processing, make further advances in high performance of fisheye lenses desirable. In addition, there is also strong demand for high portability of these imaging devices, along with a demand for compactness of the fisheye lens of the imaging device.

Japanese Patent No. 3396839 describes fisheye lenses with a relatively small number of lens elements and that provide a field angle, that is, an entire picture angle, of about one hundred eighty degrees. Additionally, Japanese Laid-Open Patent Application S53-083623 describes similar fisheye lenses.

The fisheye lenses described in Japanese Patent No. 3396839 use an equal solid angle projection and the fisheye lenses described in Japanese Laid-Open Patent Application S53-083623 use equidistance projections. However, neither of these publications describes fisheye lenses with satisfactory off-axis performance. In particular, all the aberrations in the fisheye lenses described in Japanese Laid-Open Patent Application S53-083623 are large, and none of these lenses meet the current requirements for achieving high performance.

BRIEF SUMMARY OF THE INVENTION

The present invention relates to a fisheye lens with a field of view of at least one hundred sixty degrees, having a bright image with an f-number in the range of 1.2 to 1.65, having superior optical performance, and that is compact. The present invention further relates to an imaging device that uses such a fisheye lens in order to achieve desirable properties related to the use of such a fisheye lens, including compactness of the entire imaging device.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the fisheye lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
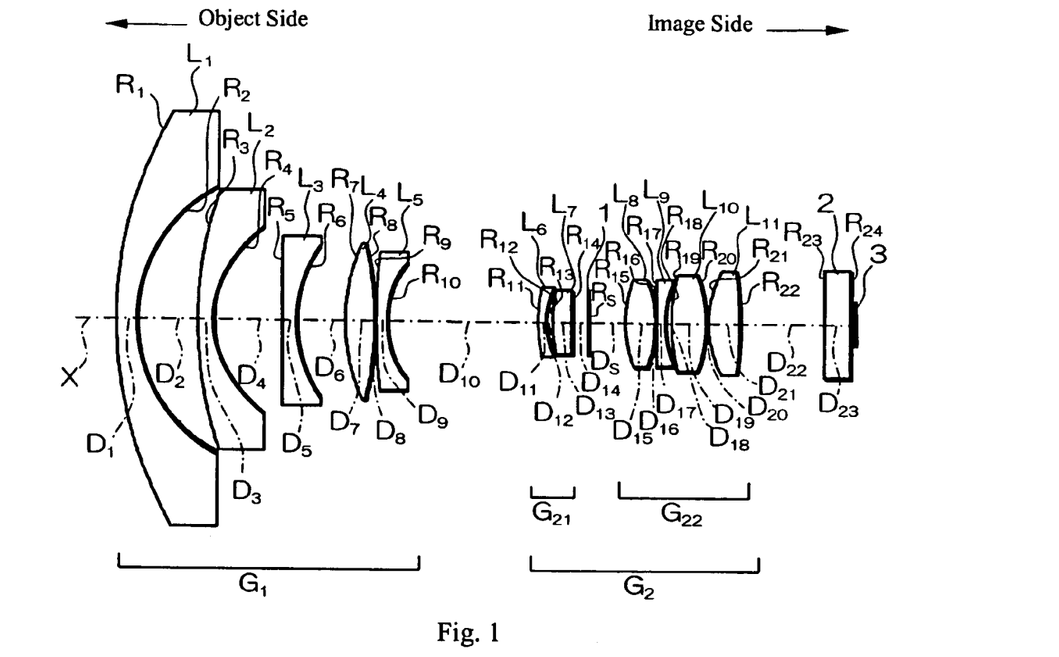
FIG. 1 shows a cross-sectional view of the fisheye lens of Embodiment 1 of the present invention.

A general description of the fisheye lens of the present invention that pertains to disclosed embodiments of the invention will now be described with reference to FIG. 1 that shows Embodiment 1. In FIG. 1, a horizontal arrow at the upper left of FIG. 1 that points left indicates the object side of the fisheye lens, and a horizontal arrow at the upper right of FIG. 1 that points right indicates the image side of the fisheye lens. In FIG. 1, lens elements are referenced by the letter L with a subscript denoting their order from the object side of the fisheye lens along the optical axis X, from $L_1$ to $L_{11}$. Similarly, the radii of curvature of the optical surfaces are referenced by the letter R with a subscript denoting their order from the object side of the fisheye lens, from $R_1$ to $R_{24}$. The on-axis surface spacings along the optical axis X of the various optical surfaces are referenced by the letter D with a subscript denoting their order from the object side of the fisheye lens, from $D_1$ to $D_{23}$. In the same manner, two lens groups are labeled $G_1$ and $G_2$ in order from the object side of the fisheye lens, and the optical components belonging to each lens group are indicated by brackets adjacent the labels $G_1$ and $G_2$. In accordance with the definition of a lens group above, lens group $G_2$ is divided in FIG. 1 into lens groups $G_{21}$ and $G_{22}$, with the second digit of the subscripts denoting their order from the object side of the fisheye lens. A stop 1, such as a diaphragm, is located between lens groups $G_2$, and $G_{22}$. As shown in FIG. 1, on the image side of lens group $G_2$ is a glass block 2 that has plane parallel surfaces and that protects an image plane 3 where the light receiving surface of an image pickup element, such as a CCD, is positioned. The glass block 2 may represent not only a cover glass but also an infrared cut off filter and/or a low pass filter that may be used in the fisheye lens.

The first lens group $G_1$ has negative refractive power and the second lens group $G_2$ has positive refractive power. As shown in FIG. 1, the first lens group $G_1$ is formed of five lens elements, arranged in order from the object side, as follows: two lens elements, $L_1$ and $L_2$, each having negative refractive power and a meniscus shape with the convex surface on the object side; a lens element $L_3$ having negative refractive power with a concave surface on the image side; and two lens elements, $L_4$ and $L_5$, one having positive refractive power and one having negative refractive power. The second lens group $G_2$ is formed of, arranged in order from the object side: the lens group $G_{21}$ that includes at least one lens element having positive refractive power and at least one lens element having negative refractive power; the stop 1; and the lens group $G_{22}$ that includes at least one lens element having positive refractive power and a negative lens element. In addition, maximum field angle, that is, the entire picture angle, of the fisheye lens is at least 160 degrees.

In this manner, the first lens group $G_1$ is advantageously constructed with the two adjacent lens elements $L_1$ and $L_2$ on the object side of the fisheye lens being meniscus lens elements of negative refractive power with their convex surfaces on the object side so as to enable very wide angle viewing. In addition, by making the third lens element from the object side $L_3$ have negative refractive power, the negative refractive power required near the object side of the fisheye lens can be partially apportioned to the third lens element $L_3$. This enables avoiding excessive refraction being required of off-axis light rays at the lens surfaces, which helps suppress off-axis aberrations.

Additionally, because the fourth and fifth lens elements from the object side, $L_4$ and $L_5$, have refractive powers of opposite sign, through the choice of lens parameters, including the arrangement, spacing, surface shape, and choice of the lens materials of the lens elements, such as for example using a nitrate glass, lateral color and other aberrations produced by the entire fisheye lens or by the first lens group $G_1$ can be reduced.

In addition, the lens group $G_{21}$ is primarily responsible for correcting on-axis chromatic aberrations, which relate to different locations of the image plane along the optical axis X for different wavelengths, and for correcting spherical aberration. On the other hand, the lens group $G_{22}$ corrects lateral color and curvature of field, and also moves the exit pupil farther away in order for light to be efficiently received at the image plane 3 where the light receiving surface of an image pickup element, such as a CCD, is positioned. Furthermore, lens group $G_{22}$ provides a long back focus using at least three lens elements, with two of the lens elements together having positive refractive power and another lens element having negative refractive power.

Also, in the fisheye lens of the present invention, the on-axis distance between the image-side surface of said first lens group $G_1$ and the object-side surface of said second lens group $G_2$ is greater than the on-axis distance between any other adjacent surfaces of any of the lens elements of the fisheye lens. By doing this, curvature of field that occurs with a large field angle, that is, a large picture angle, can be favorably corrected. In addition, for compactness it is necessary that other lens elements be spaced close together. Furthermore, by enlarging the on-axis distance between the first lens group $G_1$ and the second lens group $G_2$ to be the largest on-axis distance of the entire lens system, simultaneously satisfying requirements of miniaturization and high performance of the lens system becomes possible.

In this regard, the fisheye lens of the present invention preferably satisfies the following Condition (1):

$$0.12 < Dm/Ds < 0.25 \qquad \text{Condition (1)}$$

where

Dm is the on-axis distance between the image-side surface of the first lens group $G_1$ and the object-side surface of the second lens group $G_2$, and Ds is the on-axis distance from the object-side surface of the object-side lens element of the fisheye lens to the image-side surface of the image-side lens element of the fisheye lens.

If the lower limit of Condition (1) above is not satisfied, the on-axis distance between the first lens group $G_1$ and the second lens group $G_2$ is inadequate and correction of curvature of field cannot be made. On the other hand, if the upper limit of Condition (1) above is not satisfied, the on-axis distance between the first lens group $G_1$ and the second lens group $G_2$ is too great, making it difficult to maintain adequate on-axis distances between other lens elements to obtain a high performance fisheye lens. Thus, by satisfying Condition (1), it becomes possible to simultaneously achieve both high performance and compactness.

In addition, the fisheye lens of the present invention preferably satisfies the following Condition (2):

$$-0.15 < (Ym - Ym_o)/Ym_o < 0.15 \qquad \text{Condition (2)}$$

where

Ym is the image height at the maximum field angle, and $Ym_o$ is the ideal image height at the maximum field angle, which is equal to $f \cdot \theta m$ where f is the focal length of the fisheye lens and $\theta m$ is the maximum half-field angle, in radians.

If the lower limit of Condition (2) above is not satisfied, the images of objects at the edge of the field of view are too small. On the other hand, if the upper limit of Condition (2)

above is not satisfied, peripheral objects are more greatly imaged, which has the advantage in expansion processing of peripheral images. But, in realizing high performance in this case, the lens system becomes undesirably large in attempting to assure an adequate amount of peripheral light being processed by the lens system.

Using computer software for image processing, a portion of the image formed by the lens may be removed and picture image expansion can be performed that allows high contrast images of peripheral objects in the field of view to be created when photography is done with an ordinary imaging lens. Furthermore, by satisfying Condition (2) above, picture image expansion and high contrast images can be achieved in the compact fisheye lens of the present invention using requisite amounts of peripheral light in the lens system.

In addition, the fisheye lens of the present invention preferably satisfies the following Conditions (3) and (4):

$$-0.03<(Ym-Ym_o)/Ym_o<0.03 \quad \text{Condition (3)}$$

$$0.70<|(dYm/d\theta)/f|<1.2 \quad \text{Condition (4)}$$

where $Ym$ is the image height at the maximum field angle, $Ym_o$ is the ideal image height at the maximum field angle, which is equal to $f \cdot \theta m$ where f is the focal length of the fisheye lens and $\theta m$ is the maximum half-field angle, in radians, and $dYm/d\theta$ is the derivative of Ym with respect to the light beam half-field angle $\theta$, in radians.

By satisfying Condition (3) above, substantially equidistant image projection is achieved. In equidistant image projection, the relationship between the image height Y and the half-field angle $\theta$ are related by the equation $Y=f \cdot \theta$ so that f is a constant. In this case, picture image expansion processing can be accomplished on the basis of a simple equation, reducing the amount of computation. With a small amount of computation, a high degree of resolution becomes possible, which is beneficial in a system in which the number of frames is large for each unit of time. In this regard, for example, as described in the above-mentioned Japanese Patent No. 3396839, using equal solid angle projections at the time of executing picture image expansion processing for picture images acquired by an image pickup element makes it impossible to use a simple equation for image conversion, thus greatly increasing the amount of data computation required. As a result, achieving an increase in the number of frames for each unit of time becomes difficult.

In addition, by satisfying Condition (4) above, distortion resulting from image processing related to expanding the images can be reduced.

The imaging device of the present invention is characterized by mounting the fisheye lens described above for projecting real images of objects onto an image plane where the light receiving surface of an image pickup element, such as a CCD, is located.

Furthermore, the fisheye lens of the present invention has anti-reflection films on all the lens surfaces, including the four lens surfaces of the two lens elements $L_1$ and $L_2$, which are closest to the object side. In the fisheye lens of the present invention, the anti-reflection films on these four lens surfaces have reflection minima in their characteristic anti-reflection curves of reflection versus wavelength at wavelengths that are only 40 nm to 180 nm larger than the wavelengths of reflection minima of characteristic anti-reflection curves of reflection versus wavelength of the other lens surfaces of the fisheye lens.

This is done because the peripheral light fluxes are incident on the surfaces on the object sides of lens elements $L_1$ and $L_2$ at large angles measured relative to normals to the surfaces. As a result, in these lens surfaces, wavelengths for which the reflection is reduced are shifted to the short wavelength side for all four of these lens surfaces.

In addition, the radii of curvature of the image-side surfaces of the lens elements $L_1$ and $L_2$, must become smaller than the radii of curvature of the object-side surfaces of the lens elements $L_1$ and $L_2$, within the effective diameter of the fisheye lens, as shown in FIG. 1. The film thickness of the anti-reflection film becomes thinner toward the periphery of the lens surfaces of these lens elements, and the wavelength of minimum reflection for the anti-reflection film shifts toward shorter wavelengths as the anti-reflection film becomes thinner.

Therefore, in summary, in the fisheye lens of the present invention, the construction of the anti-reflection films on the lens elements $L_1$ and $L_2$ are based on considering characteristics of the centers of the lens elements that are on the optical axis and by considering reflection versus wavelength curves for anti-reflection films on lens surfaces in terms of the wavelengths where reflection minima occur in order to determine increases in film thicknesses to cause a wavelength shift of only 40 nm to 180 nm in reflection minima, which enables reducing flare and ghost images while increasing the amount of peripheral light transmitted by the fisheye lens.

Additionally, in the case where the anti-reflection film is a single layer film, because the wavelength position of minimum reflection relates to only one wavelength, the wavelength may be a standard wavelength. However, in the case where the anti-reflection film is multilayered, if multiple wavelength positions relate to different reflection minima, then the light reflection ratio characteristics for low reflection on the long wavelength side for the various minima are considered, and the amount of the desired wavelength shifting is determined.

Four embodiments of the present invention will now be individually described with reference to the drawings. In all four embodiments, the second lens group $G_2$ is divided into two lens groups, $G_{12}$ and $G_{22}$ in that order from the object side.

Embodiment 1

FIG. 1 shows a cross-sectional view of the fisheye lens of Embodiment 1 of the present invention. As shown in FIG. 1, the fisheye lens of Embodiment 1 includes, arranged in order from the object side, a first lens group $G_1$ that includes five lens elements, $L_1$–$L_5$, and a second lens group $G_2$ that includes, arranged in order from the object side, two lens elements, $L_6$ and $L_7$, that form a lens group $G_{21}$, a stop 1, and lens elements $L_8$–$L_{11}$ that form a lens group $G_{22}$. In Embodiment 1, all the lens elements are lens components.

Table 1 below lists the surface number # (except for the stop, which is listed as 'Stop') in order from the object side, the radius of curvature R (in mm) of each surface, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f, the f-number $F_{NO}$, the half-field angle $\omega$, the back focal length bf, the on-axis distance EXP from the image plane to the exit pupil, and the on-axis distance Ds from the object-side surface of the object-side lens element of the fisheye lens to the image-side surface of the image-side lens element of the fisheye lens.

TABLE 1

| # | R | D | $N_d$ | $v_d$ |
|---|---|---|---|---|
| 1 | 28.772 | 1.40 | 1.80153 | 47.8 |
| 2 | 10.153 | 4.05 | | |
| 3 | 27.858 | 1.12 | 1.74480 | 53.5 |
| 4 | 7.496 | 4.67 | | |
| 5 | −784.150 | 0.98 | 1.72440 | 55.3 |
| 6 | 8.983 | 3.21 | | |
| 7 | 13.228 | 1.95 | 1.83250 | 23.4 |
| 8 | −22.319 | 0.09 | | |
| 9 | 43.491 | 0.79 | 1.65715 | 58.6 |
| 10 | 6.516 | 10.10 | | |
| 11 | 11.664 | 0.59 | 1.78960 | 49.0 |
| 12 | 4.526 | 0.40 | | |
| 13 | 10.488 | 1.29 | 1.76798 | 34.1 |
| 14 | ∞ | 1.07 | | |
| Stop | ∞ | 2.54 | | |
| 15 | 8.370 | 2.01 | 1.48944 | 65.4 |
| 16 | −8.165 | 0.09 | | |
| 17 | −589.324 | 0.59 | 1.89999 | 26.3 |
| 18 | 6.659 | 0.41 | | |
| 19 | 13.773 | 2.35 | 1.52858 | 63.9 |
| 20 | −9.534 | 0.08 | | |
| 21 | 7.585 | 2.12 | 1.61993 | 60.4 |
| 22 | −29.097 | 0.00 | | |
| 23 | ∞ | 1.75 | 1.51680 | 64.2 |
| 24 | ∞ | | | | f = 1.00 $F_{NO}$ = 1.43 ω = 92.5° bf = 6.78 EXP = −150.84 Ds = 41.91

The fisheye lens of Embodiment 1 satisfies Conditions (1)–(4) above, as set forth in Table 2 below. The value shown for Condition (2) in Table 2 must be multiplied by one hundred in order to express the percent distortion, as distortion is commonly expressed and graphed as a percentage as shown in FIGS. 4C, 5C, 6C, and 7C.

TABLE 2

| Condition No. | Condition | Value |
|---|---|---|
| (1) | 0.12 < Dm/Ds < 0.25 | 0.241 |
| (2) | −0.15 < (Ym − Ym$_o$)/Ym$_o$ < 0.15 | −0.005 |
| (3) | −0.03 < (Ym − Ym$_o$)/Ym$_o$ < 0.03 | −0.005 |
| (4) | 0.70 < |(dYm/dθ)/fl < 1.2 | 0.926 |

Figure 4A:
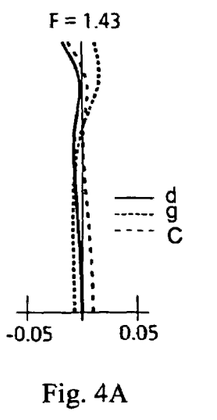
FIGS. 4A–4D show the spherical aberration, astigmatism, distortion, and lateral color, respectively, of the fisheye lens of Embodiment 1 of the present invention.
Figure 4B:
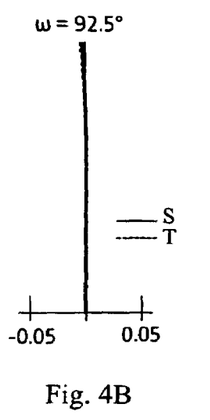
Figure 4C:
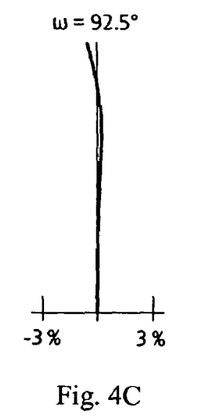
Figure 4D:
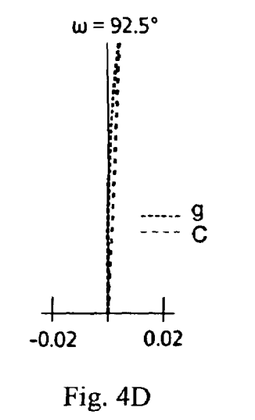
Figure 4E:
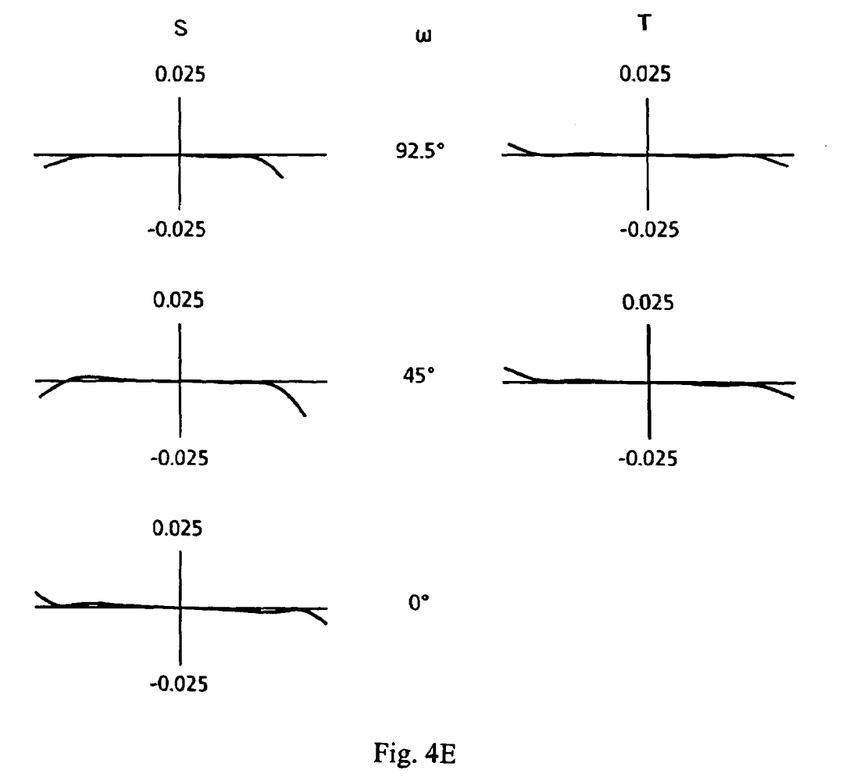
FIG. 4E shows the coma of the fisheye lens of Embodiment 1 of the present invention.

FIGS. 4A–4E show the spherical aberration, astigmatism, distortion, lateral color, and coma, respectively, of the fisheye lens of Embodiment 1. In FIG. 4A, the spherical aberration is shown for the d-line (587.6 nm), the g-line (435.8 nm), and the C-line (656.3 nm). FIGS. 4B–4D show the astigmatism, distortion, and lateral color, respectively, at a maximum half-field angle of 92.5 degrees, corresponding to a maximum field angle of 185 degrees. In FIG. 4B, the astigmatism is shown for both the sagittal image surface S and the tangential image surface T for the d-line (λ=587.6 nm). In FIG. 4D, the lateral color is shown for the g-line (λ=435.8 nm), and the C-line (λ=656.3 nm ) relative to the d-line (λ=587.6 nm). FIG. 4E shows the coma of the fisheye lens of Embodiment 1 for various half-field angles ω for both the tangential (right column) and sagittal (left column) image surfaces for the d-line (λ=587.6 nm).

As is clear from FIGS. 4A–4E and Table 2 above, the fisheye lens of Embodiment 1 provides a field angle of 185 degrees, an f-number $F_{NO}$ of 1.43, and satisfies all of Conditions (1)–(4) above, enabling a compact fisheye lens of superior optical performance to be obtained.

Additionally, the various S and T surfaces of FIGS. 4B and 4E demonstrate by their general uniformity and small variations from ideal imaging that astigmatism and coma are favorably corrected and, based on the image surface being an image plane, that curvature of field is also favorably corrected within the entire wide range of field angles being viewed while allowing a large amount of peripheral light to be used in order to obtain a uniformly bright image.

Embodiment 2

Embodiment 2 is very similar to Embodiment 1 and uses the same number of lens elements and lens components. Because Embodiment 2 is very similar to Embodiment 1, Embodiment 2 is well shown by FIG. 1 and the differences between Embodiment 2 and Embodiment 1 will be evident from Table 3 that follows.

Table 3 below lists the surface number # (except for the stop, which is listed as 'Stop') in order from the object side, the radius of curvature R (in mm) of each surface, the on-axis surface spacing D (in mm), as well as the refractive index $N_d$ and the Abbe number $v_d$ (both at the d-line of 587.6 nm) of each optical element for Embodiment 2. Listed in the bottom portion of Table 3 are the focal length f, the f-number $F_{NO}$, the half-field angle ω, the back focal length bf, the on-axis distance EXP from the image plane to the exit pupil, and the on-axis distance Ds from the object-side surface of the object-side lens element of the fisheye lens to the image-side surface of the image-side lens element of the fisheye lens.

TABLE 3

| # | R | D | $N_d$ | $v_d$ |
|---|---|---|---|---|
| 1 | 13.705 | 1.29 | 1.78192 | 49.8 |
| 2 | 4.879 | 2.11 | | |
| 3 | 8.257 | 0.59 | 1.78479 | 49.5 |
| 4 | 3.907 | 2.35 | | |
| 5 | −16.035 | 0.53 | 1.72813 | 55.1 |
| 6 | 4.429 | 2.13 | | |
| 7 | 7.654 | 1.82 | 1.77137 | 28.3 |
| 8 | −14.189 | 0.08 | | |
| 9 | 12.286 | 0.43 | 1.58108 | 61.9 |
| 10 | 4.274 | 2.90 | | |
| 11 | 5.081 | 0.78 | 1.51565 | 64.4 |
| 12 | 3.146 | 0.23 | | |
| 13 | 5.219 | 0.95 | 1.58103 | 51.5 |
| 14 | −19.805 | 0.76 | | |
| Stop | ∞ | 1.35 | | |
| 15 | 6.350 | 1.22 | 1.60835 | 60.8 |
| 16 | −5.254 | 0.04 | | |
| 17 | −9.325 | 0.32 | 1.83504 | 24.6 |
| 18 | 4.554 | 0.25 | | |
| 19 | 12.709 | 1.14 | 1.68388 | 57.3 |
| 20 | −8.445 | 0.04 | | |
| 21 | 4.413 | 1.09 | 1.68642 | 57.2 |
| 22 | 167.973 | 0.00 | | |
| 23 | ∞ | 1.12 | 1.51680 | 64.2 |
| 24 | ∞ | | | | f = 1.00 $F_{NO}$ = 1.63 ω = 92.5° bf = 3.63 EXP = −16.74 Ds = 22.41

The fisheye lens of Embodiment 2 satisfies Conditions (1)–(4) above, as set forth in Table 4 below. The value shown for Condition (2) in Table 4 must be multiplied by one hundred in order to express the percent distortion, as distortion is commonly expressed and graphed as a percentage, as shown in FIGS. 4C, 5C, 6C, and 7C.

TABLE 4

| Condition No. | Condition | Value |
|---|---|---|
| (1) | 0.12 < Dm/Ds < 0.25 | 0.129 |
| (2) | −0.15 < (Ym − Ym$_o$)/Ym$_o$ < 0.15 | −0.005 |
| (3) | −0.03 < (Ym − Ym$_o$)/Ym$_o$ < 0.03 | −0.005 |
| (4) | 0.70 < |(dYm/dθ)/f| < 1.2 | 0.908 |

Figure 5A:
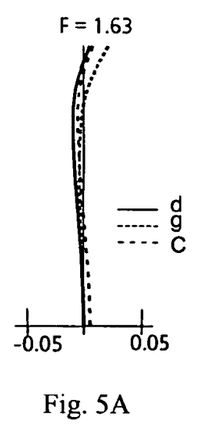
FIGS. 5A–5D show the spherical aberration, astigmatism, distortion, and lateral color, respectively, of the fisheye lens of Embodiment 2 of the present invention.
Figure 5B:
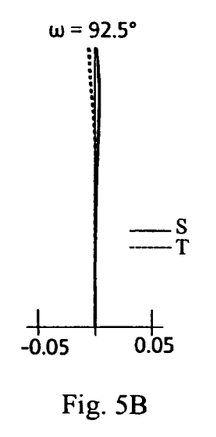
Figure 5C:
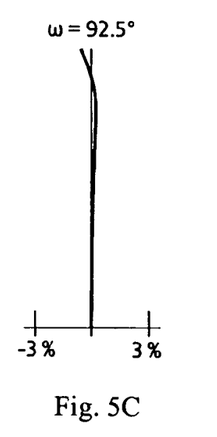
Figure 5D:
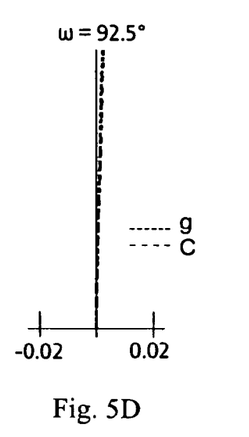
Figure 5E:
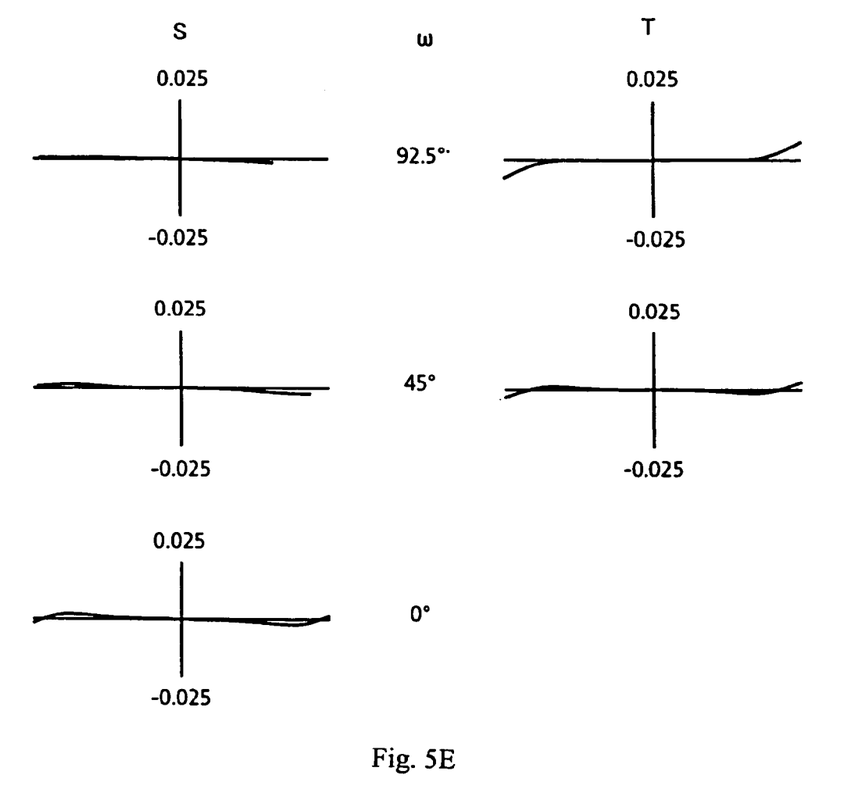
FIG. 5E shows the coma of the fisheye lens of Embodiment 2 of the present invention.

FIGS. 5A–5E show the spherical aberration, astigmatism, distortion, lateral color, and coma, respectively, of the fisheye lens of Embodiment 2. In FIG. 5A, the spherical aberration is shown for the d-line (587.6 nm), the g-line (435.8 nm), and the C-line (656.3 nm). FIGS. 5B–5D show the astigmatism, distortion, and lateral color, respectively, at various half-field angles, with a maximum half-field angle of 92.5 degrees, corresponding to a maximum field angle of 185 degrees. In FIG. 5B, the astigmatism is shown for both the sagittal image surface S and the tangential image surface T for the d-line (λ=587.6 nm). In FIG. 5D, the lateral color is shown for the g-line (λ=435.8 nm), and the C-line (λ=656.3 nm ) relative to the d-line (λ=587.6 nm). FIG. 5E shows the coma of the fisheye lens of Embodiment 2 for various half-field angles ω for both the tangential (right column) and sagittal (left column) image surfaces for the d-line (λ=587.6 nm).

As is clear from FIGS. 5A–5E and Table 4 above, the fisheye lens of Embodiment 2 provides a field angle of 185 degrees, an f-number $F_{NO}$ of 1.63, and satisfies all of Conditions (1)–(4) above, enabling a compact fisheye lens of superior optical performance to be obtained.

Additionally, the various S and T surfaces of FIGS. 5B and 5E demonstrate by their general uniformity and small variations from ideal imaging that astigmatism and coma are favorably corrected and, based on the image surface being an image plane, that curvature of field is also favorably corrected within the entire wide range of field angles being viewed while allowing a large amount of peripheral light to be used in order to obtain a uniformly bright image.

Embodiment 3

Figure 2:
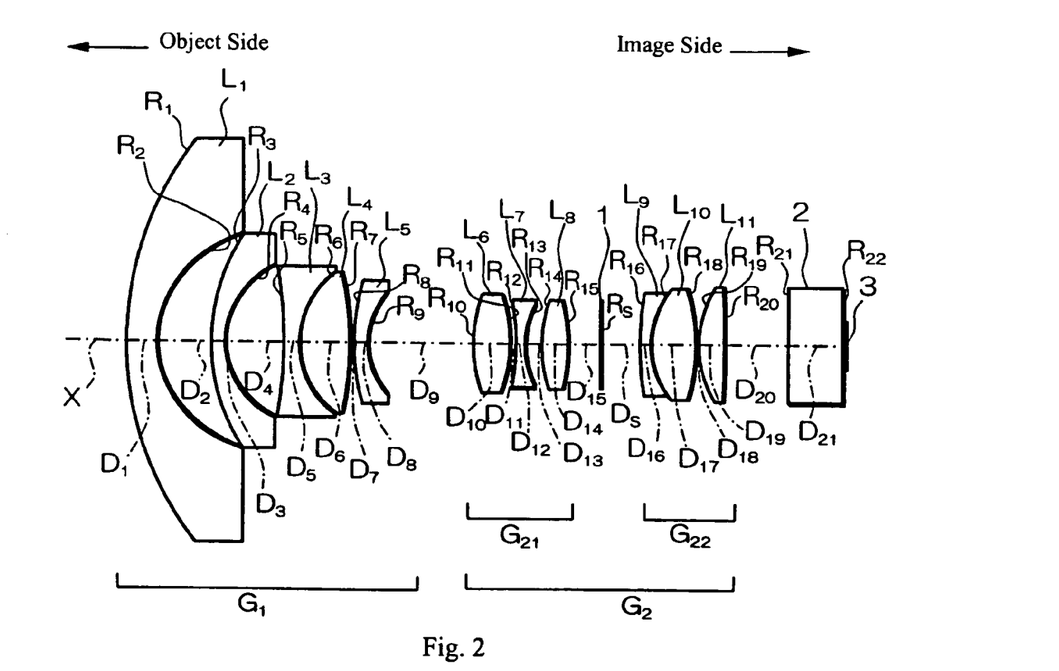
FIG. 2 shows a cross-sectional view of the fisheye lens of Embodiment 3 of the present invention.

FIG. 2 shows a cross-sectional view of the fisheye lens of Embodiment 3 of the present invention. Embodiment 3 is similar to Embodiment 1 and uses the same number of lens elements but a fewer number of lens components. As shown in FIG. 2, the fisheye lens of Embodiment 3 includes, arranged in order from the object side: a first lens group $G_1$ that includes five lens elements, $L_1$–$L_5$; and a second lens group $G_2$ that includes, arranged in order from the object side, three lens elements, $L_6$–$L_8$, that form a lens group $G_{21}$, a stop 1, and lens elements $L_9$–$L_{11}$ that form a lens group $G_{22}$. Because Embodiment 3 is very similar to Embodiment 1, the differences between Embodiment 3 and Embodiment 1 will be evident from Table 5 that follows.

Table 5 below lists the surface number # (except for the stop, which is listed as 'Stop') in order from the object side, the radius of curvature R (in mm) of each surface, the on-axis surface spacing D (in mm), as well as the refractive index $N_d$ and the Abbe number $v_d$ (both at the d-line of 587.6 nm) of each optical element for Embodiment 3. Listed in the bottom portion of Table 5 are the focal length f, the f-number $F_{NO}$, the half-field angle ω, the back focal length bf, the on-axis distance EXP from the image plane to the exit pupil, and the on-axis distance Ds from the object-side surface of the object-side lens element of the fisheye lens to the image-side surface of the image-side lens element of the fisheye lens.

TABLE 5

| # | R | D | $N_d$ | $v_d$ |
|---|---|---|---|---|
| 1 | 20.780 | 1.96 | 1.84988 | 43.0 |
| 2 | 6.880 | 3.25 | | |
| 3 | 12.003 | 0.91 | 1.84982 | 43.0 |
| 4 | 5.161 | 3.61 | | |
| 5 | −27.302 | 1.03 | 1.85054 | 42.9 |
| 6 | 5.513 | 3.27 | 1.84880 | 22.8 |
| 7 | −18.439 | 0.12 | | |
| 8 | 13.757 | 0.90 | 1.78793 | 49.2 |
| 9 | 4.888 | 6.45 | | |
| 10 | 9.131 | 2.39 | 1.49999 | 57.5 |
| 11 | −8.328 | 0.22 | | |
| 12 | −13.778 | 0.63 | 1.84995 | 40.5 |
| 13 | 5.690 | 0.96 | | |
| 14 | 8.213 | 1.79 | 1.59991 | 38.0 |
| 15 | −10.048 | 1.84 | | |
| Stop | ∞ | 2.62 | | |
| 16 | 21.168 | 0.66 | 1.84994 | 22.6 |
| 17 | 5.510 | 2.78 | 1.57613 | 62.1 |
| 18 | −11.980 | 0.10 | | |
| 19 | 6.968 | 1.61 | 1.73001 | 55.0 |
| 20 | −82.089 | 2.72 | | |
| 21 | ∞ | 3.50 | 1.51680 | 64.2 |
| 22 | ∞ | | | | f = 1.00 $F_{NO}$ = 1.23 ω = 92.5° bf = 6.13 EXP = −26.06 Ds = 37.10

The fisheye lens of Embodiment 3 satisfies Conditions (1)–(4) above, as set forth in Table 6 below. The value shown for Condition (2) in Table 6 must be multiplied by one hundred in order to express the percent distortion, as distortion is commonly expressed and graphed as a percentage, as shown in FIGS. 4C, 5C, 6C, and 7C.

TABLE 6

| Condition No. | Condition | Value |
|---|---|---|
| (1) | 0.12 < Dm/Ds < 0.25 | 0.174 |
| (2) | −0.15 < (Ym − Ym$_o$)/Ym$_o$ < 0.15 | 0.002 |
| (3) | −0.03 < (Ym − Ym$_o$)/Ym$_o$ < 0.03 | 0.002 |
| (4) | 0.70 < |(dYm/dθ)/f| < 1.2 | −1.035 |

Figure 6A:
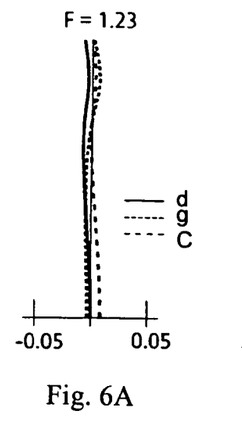
FIGS. 6A–6D show the spherical aberration, astigmatism, distortion, and lateral color, respectively, of the fisheye lens of Embodiment 3 of the present invention.
Figure 6B:
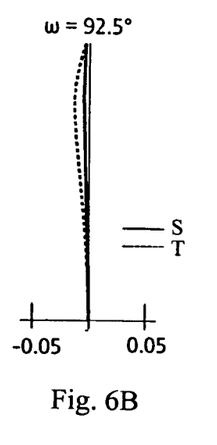
Figure 6C:
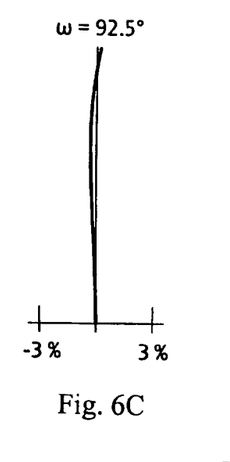
Figure 6D:
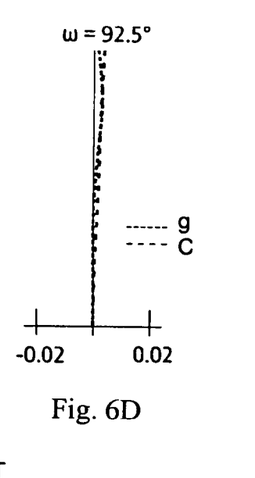
Figure 6E:
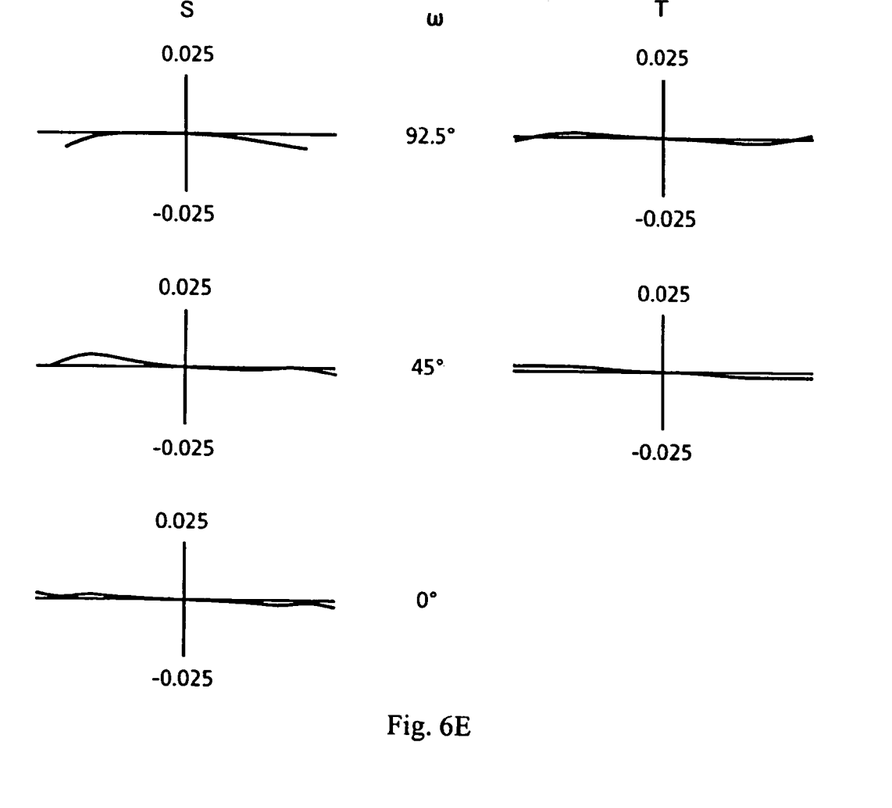
FIG. 6E shows the coma of the fisheye lens of Embodiment 3 of the present invention.

FIGS. 6A–6E show the spherical aberration, astigmatism, distortion, lateral color, and coma, respectively, of the fisheye lens of Embodiment 3. In FIG. 6A, the spherical aberration is shown for the d-line (587.6 nm), the g-line (435.8 nm), and the C-line (656.3 nm). FIGS. 6B–6D show the astigmatism, distortion, and lateral color, respectively, at various half-field angles, with a maximum half-field angle of 92.5 degrees, corresponding to a maximum field angle of 185 degrees. In FIG. 6B, the astigmatism is shown for both the sagittal image surface S and the tangential image surface T for the d-line (λ=587.6 nm). In FIG. 6D, the lateral color is shown for the g-line (λ=435.8 nm), and the C-line (λ=656.3 nm ) relative to the d-line (λ=587.6 nm). FIG. 6E shows the coma of the fisheye lens of Embodiment 3 for various half-field angles ω for both the tangential (right column) and sagittal (left column) image surfaces for the d-line (λ=587.6 nm).

As is clear from FIGS. 6A–6E and Table 6 above, the fisheye lens of Embodiment 3 provides a field angle of 185 degrees, an f-number $F_{NO}$ of 1.23, and satisfies all of Conditions (1)–(4) above, enabling a compact fisheye lens of superior optical performance to be obtained.

Additionally, the various S and T surfaces of FIGS. 6B and 6E demonstrate by their general uniformity and small variations from ideal imaging that astigmatism and coma are favorably corrected and, based on the image surface being an image plane, that curvature of field is also favorably corrected within the entire wide range of field angles being viewed while allowing a large amount of peripheral light to be used in order to obtain a uniformly bright image.

Embodiment 4

Figure 3:
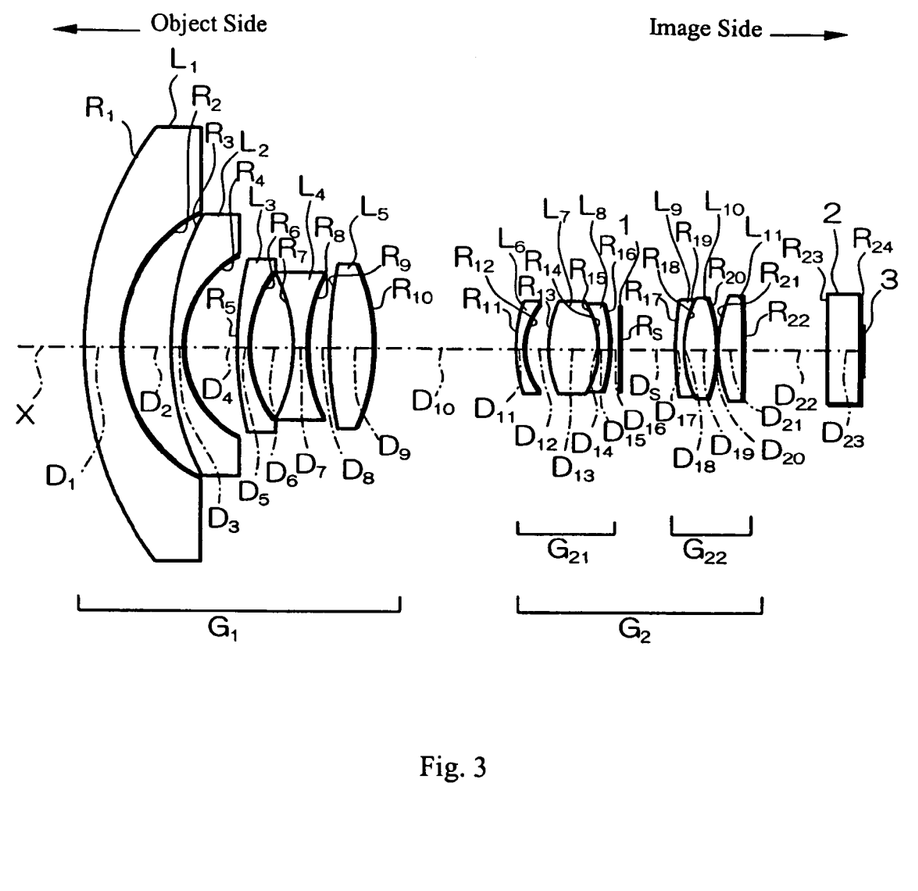
FIG. 3 shows a cross-sectional view of the fisheye lens of Embodiment 4 of the present invention.

FIG. 3 shows a cross-sectional view of the fisheye lens of Embodiment 4 of the present invention. Embodiment 4 is similar to Embodiment 1 and uses the same number of lens elements but a fewer number of lens components. As shown in FIG. 3, like Embodiment 3 above, the fisheye lens of Embodiment 4 includes, arranged in order from the object side: a first lens group $G_1$ that includes five lens elements, $L_1$–$L_5$; and a second lens group $G_2$ that includes, arranged in order from the object side, three lens elements, $L_6$–$L_8$, that form a lens group $G_{21}$, a stop 1, and lens elements $L_9$–$L_{11}$ that form a lens group $G_{22}$. Because Embodiment 4 is similar to the embodiments described above, the differences between Embodiment 4 and previously described embodiments will be evident from Table 7 that follows.

Table 7 below lists the surface number # (except for the stop, which is listed as 'Stop') in order from the object side, the radius of curvature R (in mm) of each surface, the on-axis surface spacing D (in mm), as well as the refractive index $N_d$ and the Abbe number $v_d$ (both at the d-line of 587.6 nm) of each optical element for Embodiment 4. Listed in the bottom portion of Table 7 are the focal length f, the f-number $F_{NO}$, the half-field angle ω, the back focal length bf, the on-axis distance EXP from the image plane to the exit pupil, and the on-axis distance Ds from the object-side surface of the object-side lens element of the fisheye lens to the image-side surface of the image-side lens element of the fisheye lens.

TABLE 7

| # | R | D | $N_d$ | $v_d$ |
|---|---|---|---|---|
| 1 | 20.176 | 2.00 | 1.84463 | 43.5 |
| 2 | 8.404 | 2.45 | | |
| 3 | 15.555 | 0.78 | 1.81284 | 46.7 |
| 4 | 5.758 | 2.68 | | |
| 5 | 19.993 | 0.70 | 1.74038 | 54.0 |
| 6 | 6.566 | 2.29 | | |
| 7 | −9.106 | 0.82 | 1.67509 | 57.7 |
| 8 | 10.437 | 1.13 | | |
| 9 | 22.991 | 2.31 | 1.84587 | 22.8 |
| 10 | −10.767 | 7.43 | | |
| 11 | 8.028 | 0.48 | 1.84811 | 43.1 |
| 12 | 3.982 | 1.20 | | |
| 13 | 6.053 | 2.64 | 1.50215 | 64.9 |
| 14 | −4.787 | 0.01 | | |
| 15 | −5.216 | 0.62 | 1.84706 | 36.0 |
| 16 | −8.436 | 1.48 | | |
| Stop | ∞ | 1.88 | | |
| 17 | 17.104 | 0.47 | 1.84628 | 23.0 |
| 18 | 5.910 | 0.08 | | |
| 19 | 6.234 | 1.78 | 1.50253 | 64.9 |
| 20 | −8.279 | 0.01 | | |
| 21 | 7.178 | 1.38 | 1.70518 | 56.2 |
| 22 | −80.010 | 2.51 | | |
| 23 | ∞ | 1.68 | 1.51680 | 64.2 |
| 24 | ∞ | | | | f = 1.00  $F_{NO}$ = 1.43  ω = 92.5°  bf = 5.32  EXP = −20.98  Ds = 34.64

The fisheye lens of Embodiment 4 satisfies Conditions (1)–(4) above, as set forth in Table 8 below. The value shown for Condition (2) in Table 8 must be multiplied by one hundred in order to express the percent distortion, as distortion is commonly expressed and graphed as a percentage, as shown in FIGS. 4C, 5C, 6C, and 7C.

TABLE 8

| Condition No. | Condition | Value |
|---|---|---|
| (1) | 0.12 < Dm/Ds < 0.25 | 0.215 |
| (2) | −0.15 < (Ym − $Ym_o$)/$Ym_o$ < 0.15 | −0.014 |
| (3) | −0.03 < (Ym − $Ym_o$)/$Ym_o$ < 0.03 | −0.014 |
| (4) | 0.70 < |(dYm/dθ)/f| < 1.2 | −0.885 |

Figure 7A:
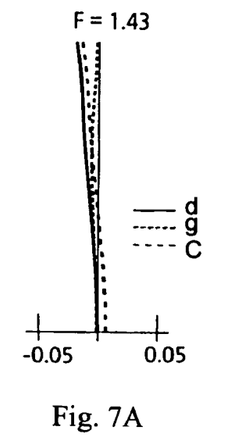
FIGS. 7A–7D show the spherical aberration, astigmatism, distortion, and lateral color, respectively, of the fisheye lens of Embodiment 4 of the present invention.
Figure 7B:
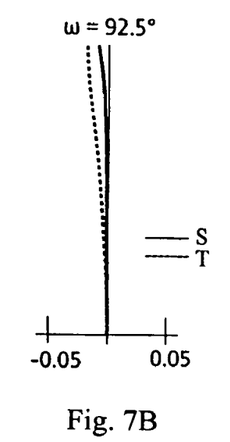
Figure 7C:
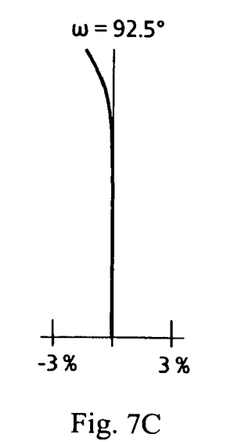
Figure 7D:
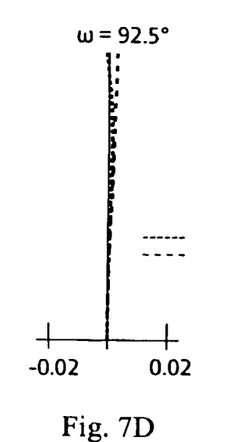
Figure 7E:
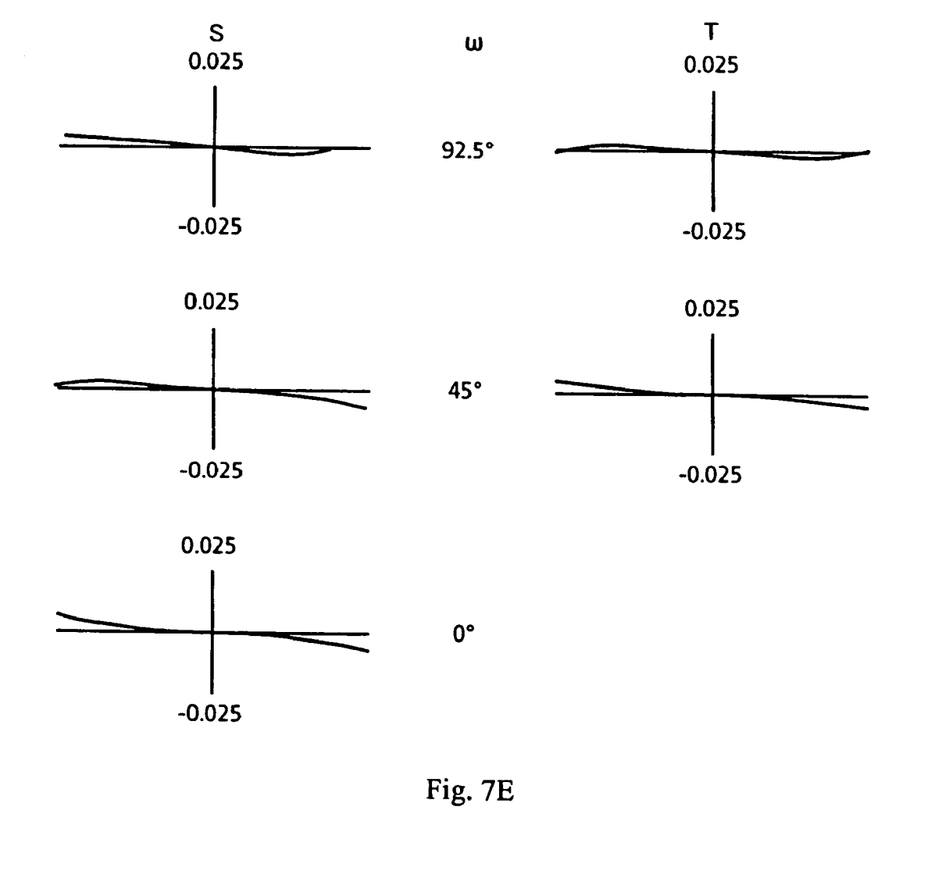
FIG. 7E shows the coma of the fisheye lens of Embodiment 4 of the present invention.

FIGS. 7A–7E show the spherical aberration, astigmatism, distortion, lateral color, and coma, respectively, of the fisheye lens of Embodiment 4. In FIG. 7A, the spherical aberration is shown for the d-line (587.6 nm), the g-line (435.8 nm), and the C-line (656.3 nm). FIGS. 7B–7D show the astigmatism, distortion, and lateral color, respectively, at various half-field angles, with a maximum half-field angle of 92.5 degrees, corresponding to a maximum field angle of 185 degrees. In FIG. 7B, the astigmatism is shown for both the sagittal image surface S and the tangential image surface T for the d-line (λ=587.6 nm). In FIG. 7D, the lateral color is shown for the g-line (λ=435.8 nm), and the C-line (λ=656.3 nm) relative to the d-line (λ=587.6 nm). FIG. 7E shows the coma of the fisheye lens of Embodiment 4 for various half-field angles ω for both the tangential (right column) and sagittal (left column) image surfaces for the d-line (λ=587.6 nm).

As is clear from FIGS. 7A–7E and Table 8 above, the fisheye lens of Embodiment 4 provides a field angle of 185 degrees, an f-number $F_{NO}$ of 1.43, and satisfies all of Conditions (1)–(4) above, enabling a compact fisheye lens of superior optical performance to be obtained.

Additionally, the various S and T surfaces of FIGS. 7B and 7E demonstrate by their general uniformity and small variations from ideal imaging that astigmatism and coma are favorably corrected and, based on the image surface being an image plane, that curvature of field is also favorably corrected within the entire wide range of field angles being viewed while allowing a large amount of peripheral light to be used in order to obtain a uniformly bright image.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Additionally, the fisheye lens of the present invention may be used in various types of imaging devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A fisheye lens comprising two lens groups, arranged in order from the object side, as follows:

a first lens group having negative refractive power; and
a second lens group having positive refractive power;
wherein the fisheye lens has a field angle of at least one hundred sixty degrees;

said first lens group includes, arranged in order from the object side, two lens elements, each having negative refractive power and a meniscus shape with the convex surface on the object side, a lens element having negative refractive power with a concave surface on the image side, and two lens elements, one having positive refractive power and one having negative refractive power;

said second lens group includes, arranged in order from the object side, two lens elements, one having positive refractive power and one having negative refractive power, a stop, and two lens elements, one having positive refractive power and one having negative refractive power; and the on-axis distance between the image-side surface of said first lens group and the object-side surface of said second lens group is greater than the on-axis distance between any other adjacent surfaces of any of the lens elements of the fisheye lens.

2. The fisheye lens of claim 1, wherein the following condition is satisfied:

$$0.12 < Dm/Ds < 0.25$$

where
Dm is the on-axis distance between the image-side surface of said first lens group and the object-side surface of said second lens group; and
Ds is the on-axis distance from the object-side surface of the object-side lens element of the fisheye lens to the image-side surface of the image-side lens element of the fisheye lens.

3. The fisheye lens of claim 2, wherein the following condition is satisfied:

$$-0.15 < (Ym - Ym_o)/Ym_o < 0.15$$

where
Ym is the image height at the maximum field angle; and
$Ym_o$ is the ideal image height at the maximum field angle, which is equal to $f \cdot \theta m$ where f is the focal length of the fisheye lens and $\theta m$ is the maximum half-field angle, in radians.

4. The fisheye lens of claim 3, wherein all of the lens elements of the fisheye lens are included in one of either said first lens group or said second lens group.

5. The fisheye lens of claim 4, wherein said first lens group includes only five lens elements and said second lens group includes only six lens elements and a stop.

6. The fisheye lens of claim 2, wherein the following conditions are satisfied:

$$-0.03 < (Ym - Ym_o)/Ym_o < 0.03$$

$$0.70 < |(dYm/d\theta)/f| < 1.2$$

where
Ym is the image height at the maximum field angle,
$Ym_o$ is the ideal image height at the maximum field angle, which is equal to $f \cdot \theta m$ where f is the focal length of the fisheye lens and $\theta m$ is the maximum half-field angle, in radians, and
$dYm/d\theta$ is the derivative of Ym with respect to the light beam half-field angle $\theta$, in radians.

7. The fisheye lens of claim 2, wherein all of the lens elements of the fisheye lens are included in one of either said first lens group or said second lens group.

8. The fisheye lens of claim 7, wherein said first lens group includes only five lens elements.

9. The fisheye lens of claim 8, wherein said second lens group includes only six lens elements and a stop.

10. An imaging device comprising:
the fisheye lens of claim 9; and
an image pickup device;
wherein
said image pickup device detects a real image formed by said fisheye lens.

11. The fisheye lens of claim 1, wherein the following condition is satisfied:

$$-0.15 < (Ym - Ym_o)/Ym_o < 0.15$$

where
Ym is the image height at the maximum field angle; and
$Ym_o$ is the ideal image height at the maximum field angle, which is equal to $f \cdot \theta m$ where f is the focal length of the fisheye lens and $\theta m$ is the maximum half-field angle, in radians.

12. The fisheye lens of claim 11, wherein all of the lens elements of the fisheye lens are included in one of either said first lens group or said second lens group.

13. The fisheye lens of claim 12, wherein said first lens group includes only five lens elements and said second lens group includes only six lens elements and a stop.

14. An imaging device comprising:
the fisheye lens of claim 13; and
an image pickup device;
wherein
said image pickup device detects a real image formed by said fisheye lens.

15. The fisheye lens of claim 1, wherein the following conditions are satisfied:

$$-0.03 < (Ym - Ym_o)/Ym_o < 0.03$$

$$0.70 < |(dYm/d\theta)/f| < 1.2$$

where
Ym is the image height at the maximum field angle,
$Ym_o$ is the ideal image height at the maximum field angle, which is equal to $f \cdot \theta m$ where f is the focal length of the fisheye lens and $\theta m$ is the maximum half-field angle, in radians, and
$dYm/d\theta$ is the derivative of Ym with respect to the light beam half-field angle $\theta$, in radians.

16. An imaging device comprising:
the fisheye lens of claim 1; and
an image pickup device;
wherein
said image pickup device detects a real image formed by said fisheye lens.

17. The fisheye lens of claim 1, wherein all of the lens elements of the fisheye lens are included in one of either said first lens group or said second lens group.

18. The fisheye lens of claim 17, wherein said first lens group includes only five lens elements.

19. The fisheye lens of claim 18, wherein said second lens group includes only six lens elements and a stop.

20. An imaging device comprising:
the fisheye lens of claim 19; and
an image pickup device;
wherein
said image pickup device detects a real image formed by said fisheye lens.

* * * * *